Sept. 27, 1932.　　　　G. LACHMANN　　　　1,879,338
AEROPLANE WING WITH GUIDE BLADES
Filed June 11, 1929　　3 Sheets-Sheet 1
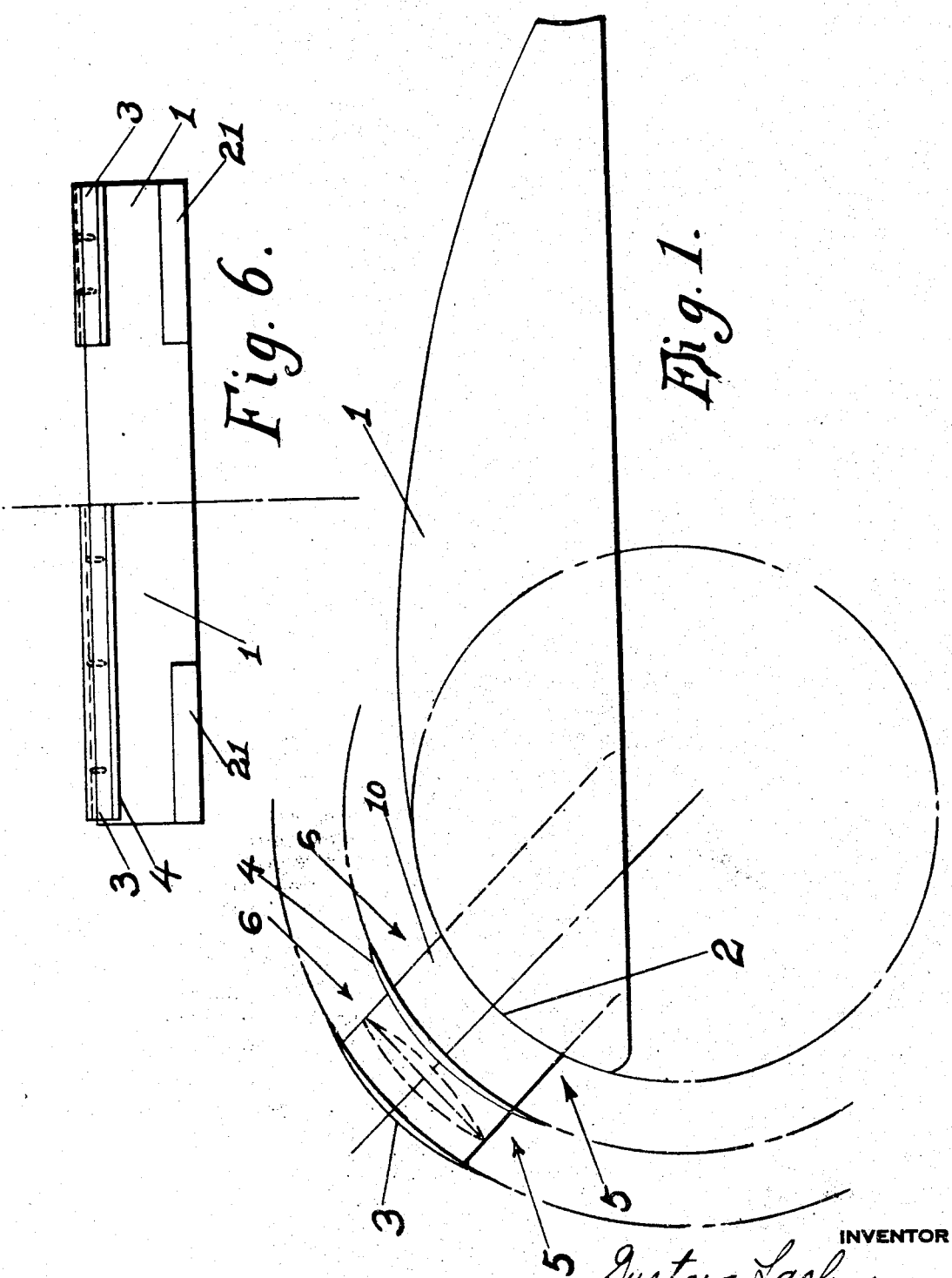

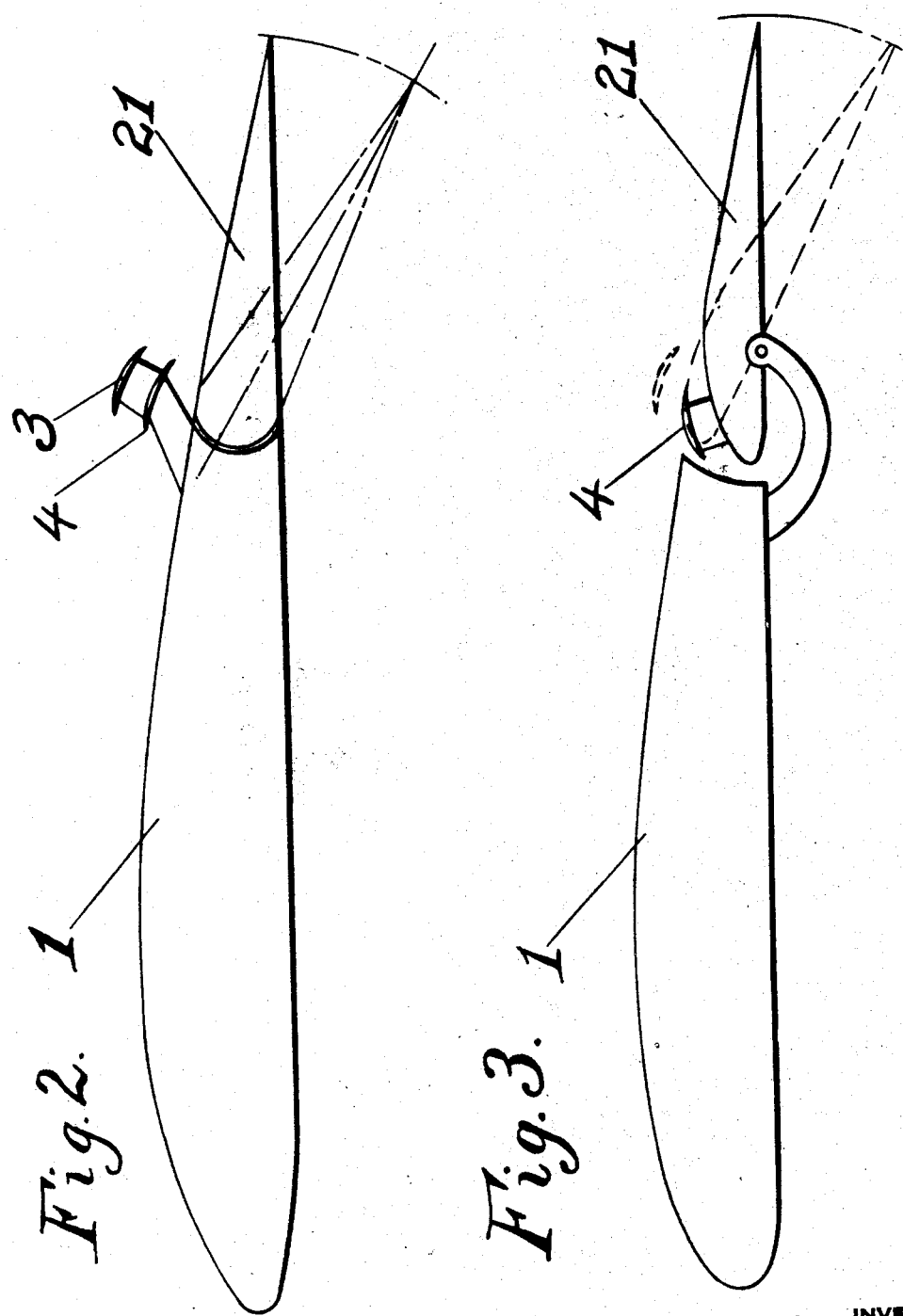

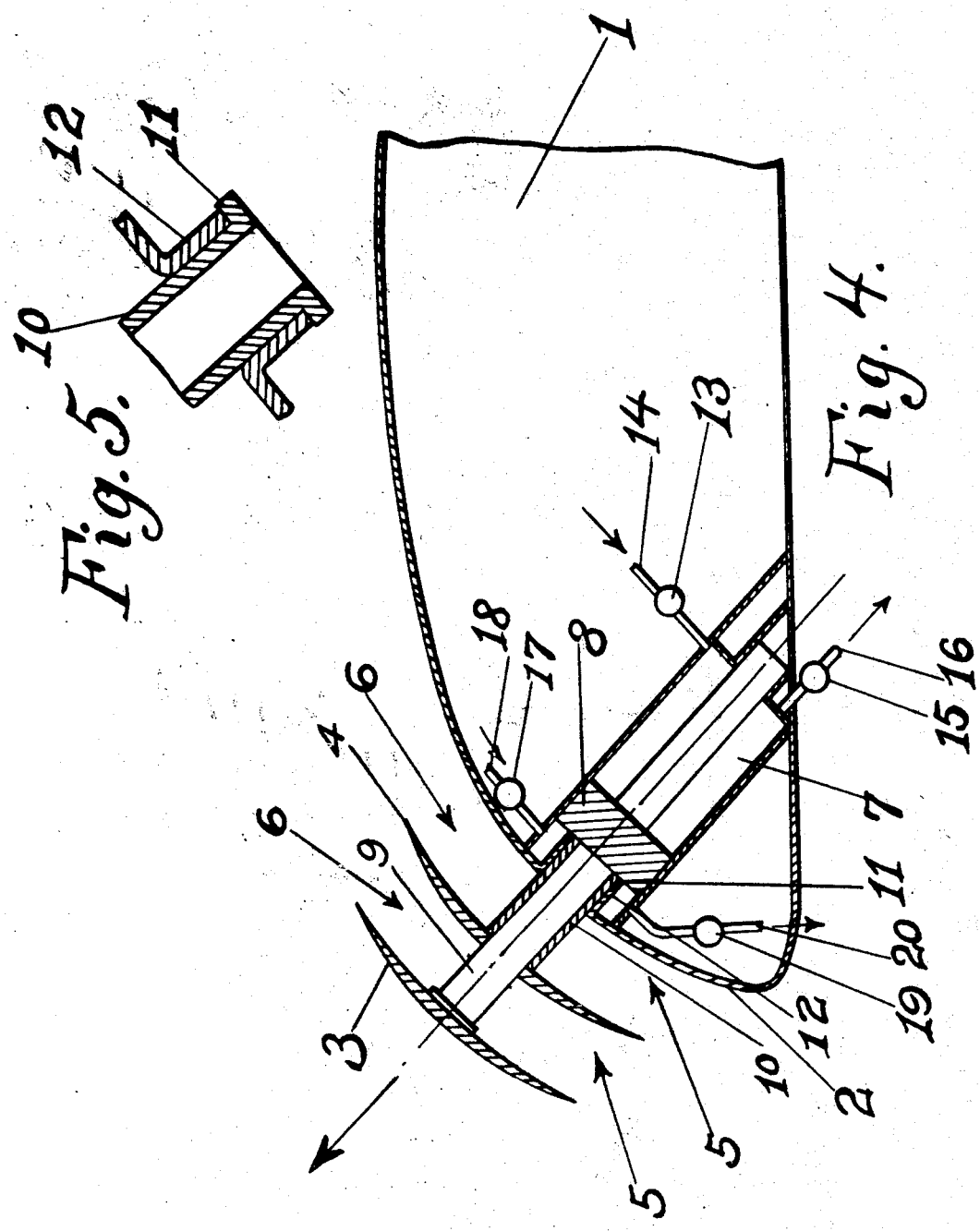

Patented Sept. 27, 1932

1,879,338

UNITED STATES PATENT OFFICE

GUSTAV LACHMANN, OF AKASAKA-KU, TOKYO, JAPAN, ASSIGNOR TO HANDLEY PAGE LIMITED, OF CRICKLEWOOD, MIDDLESEX, ENGLAND

AEROPLANE WING WITH GUIDE BLADES

Application filed June 11, 1929, Serial No. 370,115, and in Japan June 17, 1928.

The invention deals with an aeroplane wing to which guide blades of symmetrical section (symmetrical relatively to a radial symmetry axis) or nearly symmetrical section are fitted parallel to the curvature of the leading edge of the section of the main wing so that channels of equal entrance and outlet gaps are obtained. When flying with large angles of incidence the airflow is guided smoothly around the leading edge of the main wing in order to prevent burbling and to increase lift.

Explanation of drawings

The drawings show example of the application of the invention. Figs. 1, 2, and 3 are side views, Fig. 4 represents a cross-section, Fig. 5 cross-section of one detail and Fig. 6 represents a plan view of an aeroplane wing.

Detail description of the invention

Fig. 1 represents one way of applying the guide blades to the wing. The guide blades 3 and 4 having a curvature parallel to the leading edge 2 of the main wing 1 are fitted rigidly to the wing 1 by means of outriggers 10 of streamline section in such a way that the entrances 5 and the outlets 6 or 5' and 6' form equal gaps between 2 and 4 or 3 and 4 respectively.

Fig. 4 represents a device which allows to keep the blades snugly fitting to the main wing in normal flight with the view to shift them into forward position only when wanted. In order to obtain this movement guide blade 3 is fitted to rod 9 of piston 8 which slides inside of cylinder 7. This cylinder is rigidly fixed to the nosepart of the main wing 1. On the other hand rod 9 can slide telescopically inside pipe 10 to the upper end of which guide blade 4 is connected. Tube 10 is guided within the short tube 12 (see Fig. 5) which is fixed to the skin forming the outer contour of the nosepart of the wing section 1. A collar 11 stops the movement of tube 10 and prevents its slipping out of the guiding tube 12.

Piston 8 divides the inside of cylinder 7 into two chambers. The lower chamber possesses an inlet pipe 14 with a valve 13 and an outlet 16 with valve 15. Correspondingly the upper chamber is fitted with an inlet pipe 18 and an outlet 20 controlled by valve 19.

In normal flight of the aeroplane the guide blades are closely fitting to the nose of the wing, and the piston is in lower position. The upper chamber of the cylinder is filled with a compressed medium which enters through valve 17, the outlet valve 19 being closed at the same time correspondingly. The pressure acting on the top surface of the piston prevents the opening of the guiding blades according to the negative pressure which occurs on their upper surface of blade 3.

When the angle of incidence of the aeroplane increases and speed drops approaching the critical value valves 13 and 19 which are interconnected in some way open and correspondingly valves 16 and 17 are closed. Thus piston will be pushed forward and the guiding blades 3 and 4 are brought in position until collar 11 is stopped by 12. The backward movement is operated in a corresponding way. Valves 17 and 15 are opened and valves 13 and 19 closed simultaneously.

Compared with the "slotted wing" where an auxiliary airflow is made to pass from the side of positive pressure to the side of low pressure of the wing section with a consequent acceleration according to the nozzle shape of the slot no transformation of statical pressure into velocity and no acceleration of the airflow occurs in the case of the present invention only a better guiding of the airflow around the nose of the section as the channels formed between the guide blades and the nose of the section are both situated in the region of low pressure and entrance and outlet gaps are equal. Experiments with wings fitted with guiding blades of the above described kinds show a delay of burbling over a greater range of angles than the usual slotted wing.

Guiding blades can be also used to improve the efficiency of rear flaps or ailerons as shown in Figs. 2 and 3. According to Fig. 2 they are rigidly fixed to the rear end of the main wing slightly above and in front of the leading edge of the flap or aileron which is hinged to the main wing. According to Fig. 3 a guiding blade can be directly connected to the flap or aileron in such a way as to come into action only when the flap or aileron is moved downward. In both cases it is not essential that the curvature of the guide blades should be equal parallel to the curvature of the part of the wing contour below.

I claim:

1. An aeroplane wing having a guiding blade arranged at the nose thereof and corresponding cross-sectionally to the curvature of the nose of the wing so that the opposing surfaces of the nose of the wing and of the blade are substantially concentric and the channel between the wing nose and the blade is of the same width from the entrance to the outlet, and including a rod by which the blade is carried, said rod being provided with a piston and also including a cylinder in which the piston operates and means whereby the cylinder may be supplied with a compressed fluid medium to operate the piston and thereby move the blade toward and from the nose of the wing.

2. An aeroplane wing having a guiding blade arranged at the nose thereof and corresponding cross sectionally to the curvature of the nose of the wing, so that the opposing surfaces of the nose of the wing and of the blade are substantially concentric and the channel between the wing nose and the blade is of the same width from the entrance to the outlet and including telescopically arranged tubes by which said blades are carried and means to operate said tubes to enable the blades to be moved toward and from the wing nose and toward and from one another.

3. An aeroplane wing having a nose presenting a rearwardly and upwardly curved convex surface, and a plurality of guiding blades opposite said surface and each opposite another, the rearwardly and upwardly convex curvature of said blades cross sectionally corresponding with that of said surface of the nose so that the channels between the blades and between the innermost blade and the wing nose are of equal width from entrance to outlet.

4. The combination of an aircraft wing having a nose presenting an upwardly and rearwardly curved convex surface, at least one guiding blade shaped to the same curvature as the nose of the wing and located in a position spaced apart from but parallel to said nose, and means for moving said blade towards and away from the nose of the wing, in a path such that the blade remains parallel to the nose of the wing throughout such movement.

5. The combination of an aircraft wing having a nose presenting an upwardly and rearwardly curved convex surface, at least one guiding blade shaped to the same curvature as the nose of the wing and so disposed in relation to the wing as to form between itself and the wing a channel which is of constant width throughout the span of the blade, and means for moving said blade towards and away from the nose of the wing in such manner as to maintain between the blade and the nose a channel which is of uniform width throughout the span of the blade.

6. The combination of an aircraft wing having a nose presenting an upwardly and rearwardly curved convex surface, a plurality of guiding blades shaped to the same curvature as the nose of the wing and spaced apart from one another to form between each other and the nose of the wing, channels which are of constant width throughout the span of the blades, and means for moving said blades towards and away from the nose of the wing in parallel to one another and to said nose.

7. The combination of an aircraft wing having a nose presenting an upwardly and rearwardly curved convex surface, at least one guiding blade shaped to the same curvature as the nose of the wing and maintained normally in contact therewith, and means for moving said blade away from said nose along a path such that the channel formed between the blade and the nose of the wing is of constant width throughout the span of the blade.

8. The combination of an aircraft wing having a nose presenting an upwardly and rearwardly curved convex surface, a plurality of guiding blades shaped to the same curvature as the nose of the wing and maintained normally in contact therewith, and means for moving said blades away from said nose along paths such that the channel formed between adjacent blades, and between the blades and the wing are of uniform width throughout the span of the blades.

In testimony whereof I have affixed my signature.

GUSTAV LACHMANN.